(No Model.) 6 Sheets—Sheet 2.
W. T. BATE.
GAS GENERATING APPARATUS.

No. 507,981. Patented Nov. 7, 1893.

Witnesses:
Hamilton D. Turner
Alex Barkoff

Inventor
William T. Bate
by his Attorneys
Howson & Howson (No Model.) 6 Sheets—Sheet 3.
W. T. BATE.
GAS GENERATING APPARATUS.

No. 507,981. Patented Nov. 7, 1893.

Witnesses:
Inventor:
William T. Bate
by his Attorneys
Howson & Howson (No Model.) 6 Sheets—Sheet 4.
W. T. BATE.
GAS GENERATING APPARATUS.

No. 507,981. Patented Nov. 7, 1893.

Witnesses:
Hamilton D. Turner.
Alex. Barkoff

Inventor:
William T. Bate
by his Attorneys
Howson & Howson (No Model.)

W. T. BATE.
GAS GENERATING APPARATUS.

No. 507,981.

6 Sheets—Sheet 5.

Patented Nov. 7, 1893.

Witnesses
Edwin L. Bradford
D. B. Gallatin

Inventor
William T. Bate
By Chas. E. Barber
Attorney (No Model.) 6 Sheets—Sheet 6.
W. T. BATE.
GAS GENERATING APPARATUS.

No. 507,981. Patented Nov. 7, 1893.

Witnesses:
Murray C Boyer
Eugene Elterich

Inventor:
William T. Bate
by his Attorneys
Howson & Howson

UNITED STATES PATENT OFFICE.

WILLIAM T. BATE, OF CONSHOHOCKEN, PENNSYLVANIA.

GAS-GENERATING APPARATUS.

SPECIFICATION forming part of Letters Patent No. 507,981, dated November 7, 1893.

Application filed May 13, 1889. Serial No. 310,492. (No model.) Patented in England December 11, 1888, No. 18,027.

*To all whom it may concern:*

Be it known that I, WILLIAM T. BATE, a citizen of the United States, and a resident of Conshohocken, Montgomery county, Pennsylvania, have invented certain Improvements in Gas-Generating Apparatus, (patented in Great Britain December 11, 1888, No. 18,027,) of which the following is a specification.

My invention consists of certain improvements in gas generating apparatus known as producer generators, and my present improvements comprising certain details in the construction of gas apparatus of this character, with a view of effecting economy in the operation of the same; improving the quality of the gas produced, and increasing the production by preventing the waste of gas attendant upon the present method of manufacture. These objects I attain in the manner hereinafter set forth, reference being had to the accompanying drawings, in which—

Figure 1:
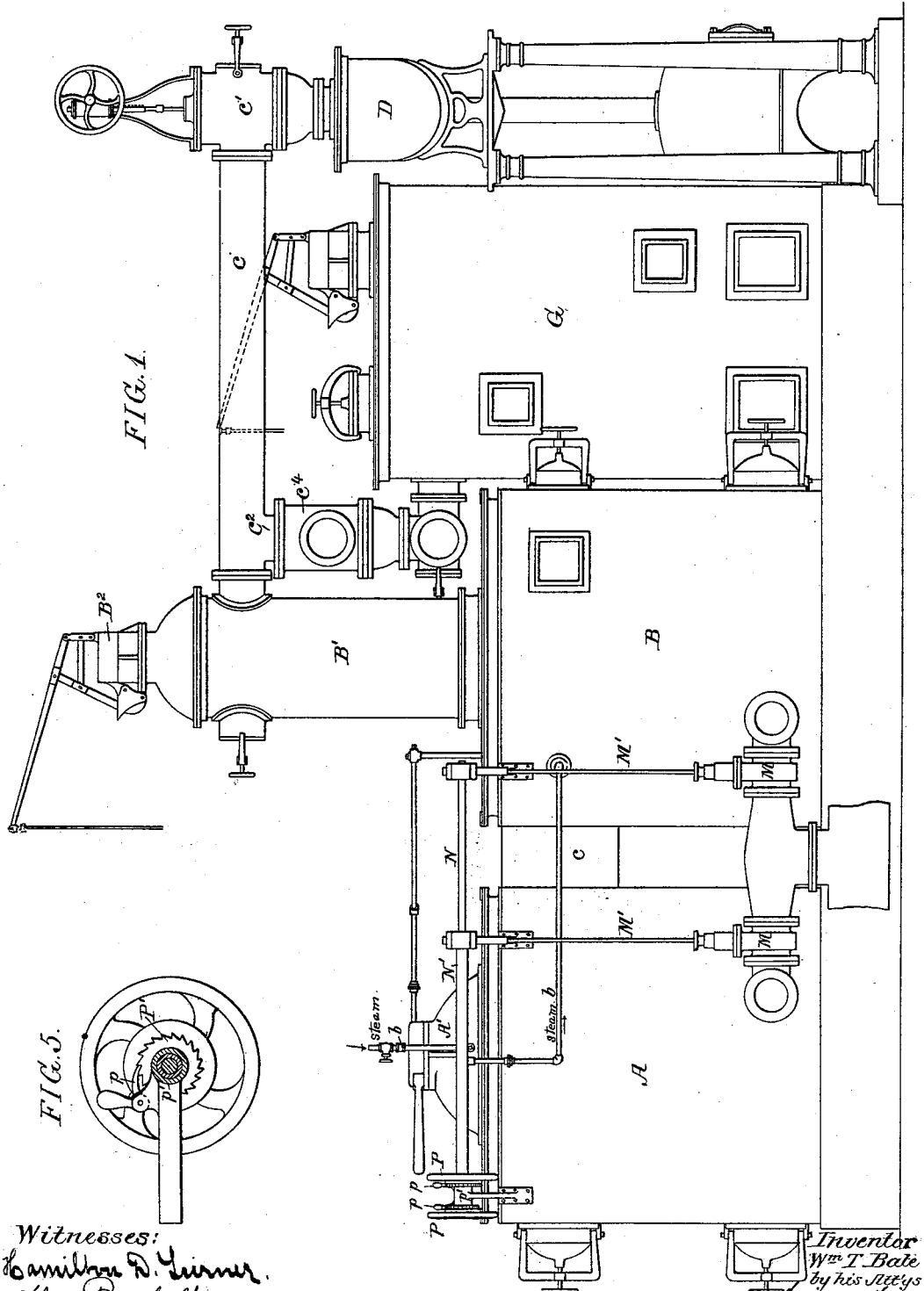
Figure 2:
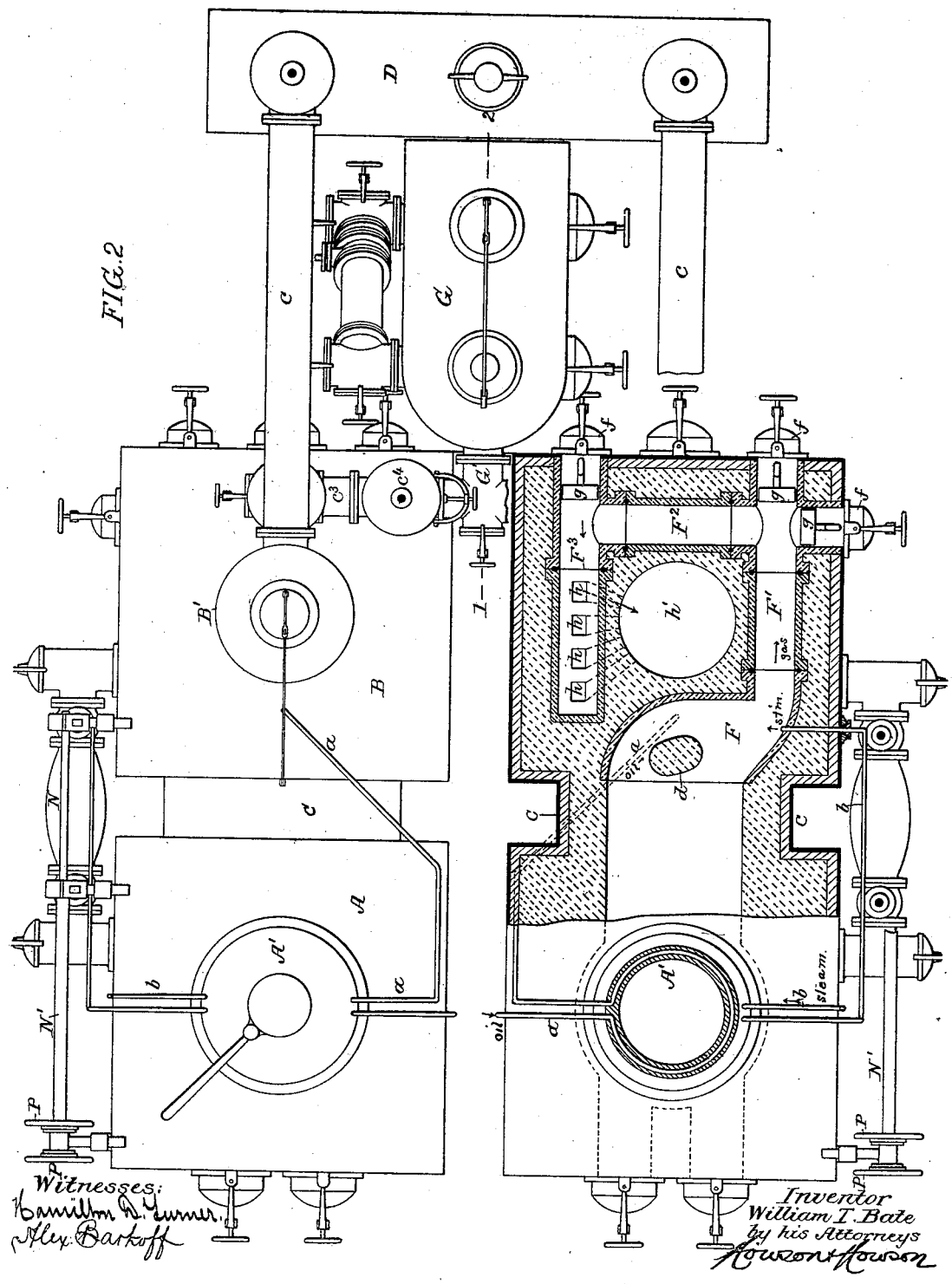
Figure 3:
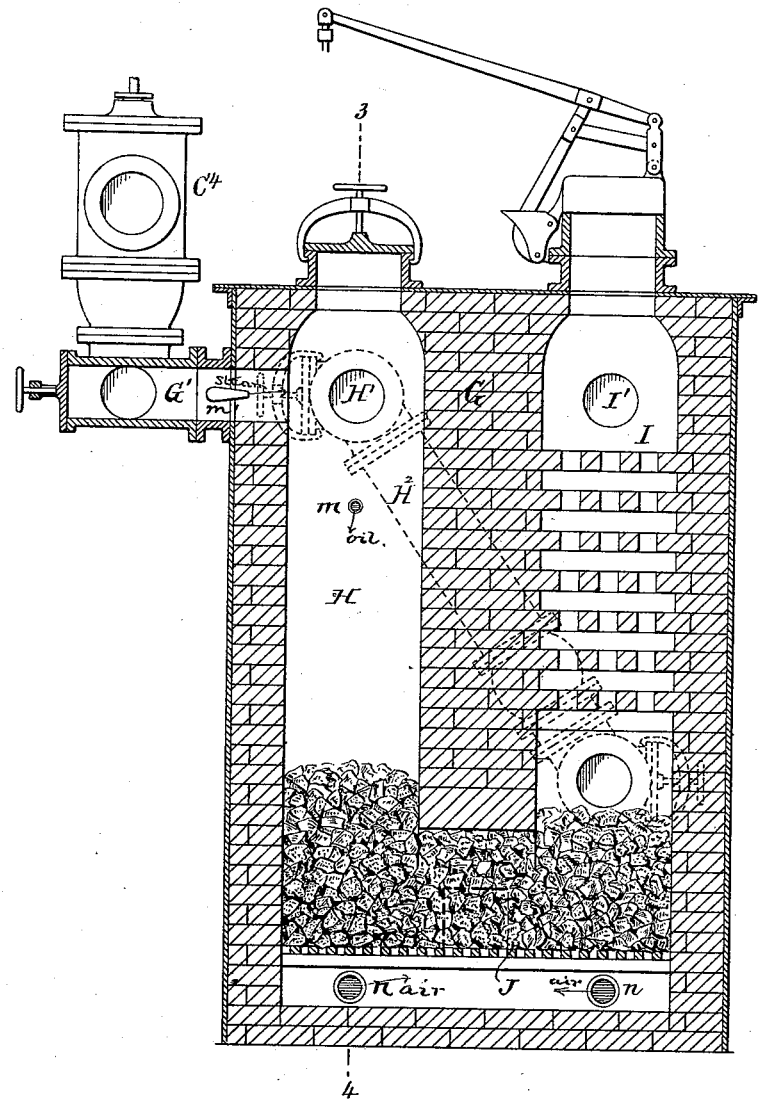
Figure 4:
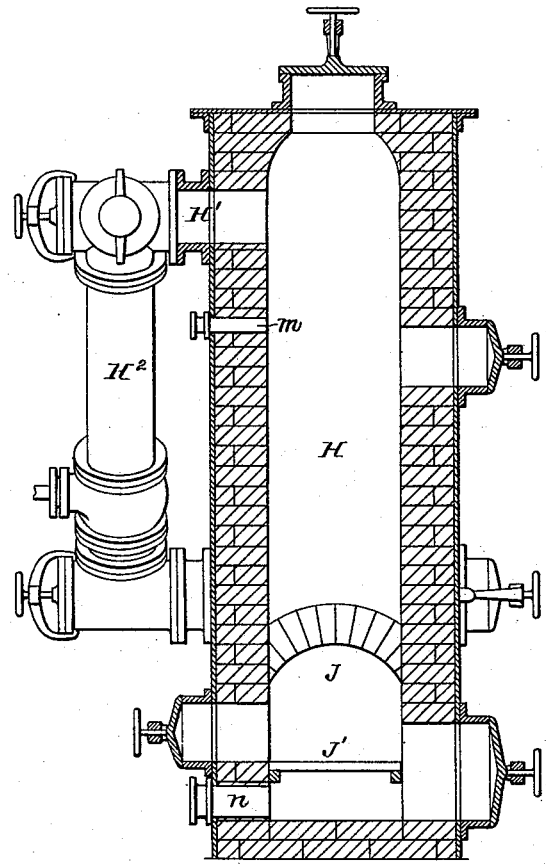
Figure 7:
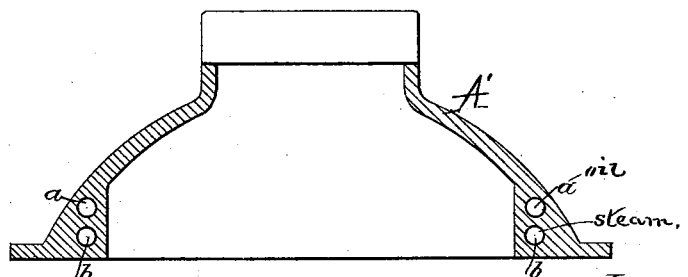
Figure 8:
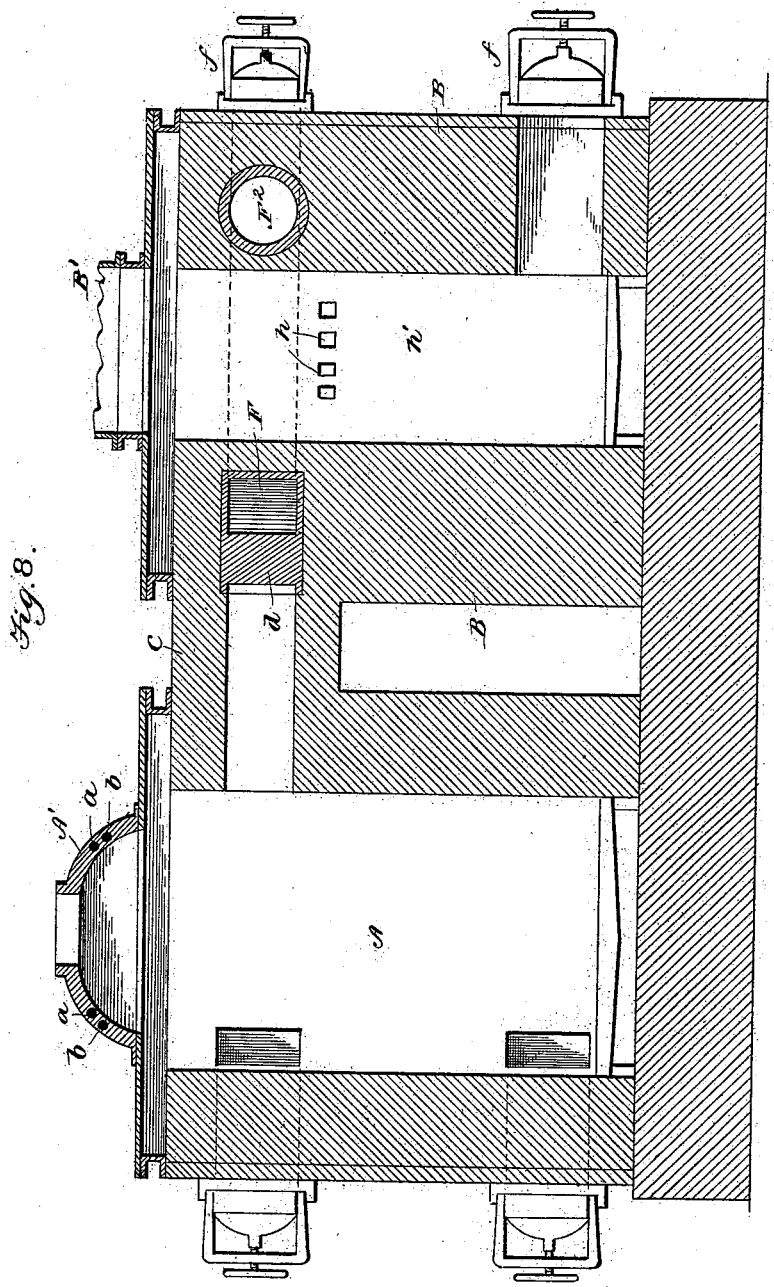
Figure 9:
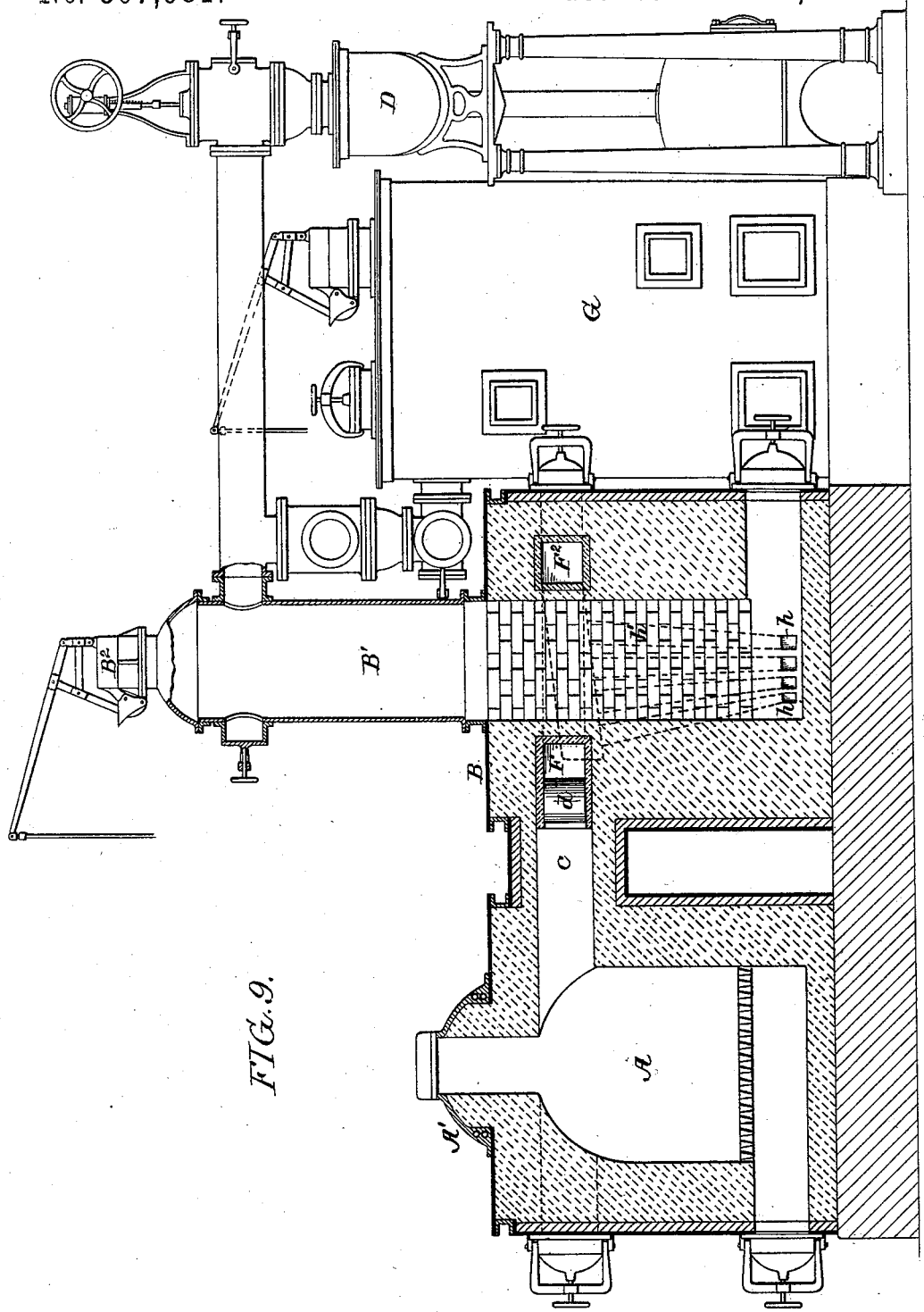

Figure 1 is a side view of a gas apparatus constructed in accordance with my invention. Fig. 2 is a plan view of the same partly in section. Fig. 3 is a longitudinal section on an enlarged scale on the line 1—2 of Fig. 2. Fig. 4 is a transverse section on line 3—4, Fig. 3. Figs. 5, 6, 7, and 8 are devices illustrating on a larger scale certain features of construction of parts of the apparatus, and Fig. 9 is a view of the apparatus partly in longitudinal section and partly in elevation.

Referring to the drawings, A designates the fire place of the apparatus, and B the superheater or fixing structure, two independent (see Fig. 2) so that gas can be generated in one apparatus during the time that the fire is being blown up on the fire place of the other apparatus, the superheater dome B' of each apparatus being connected by a pipe $c$ and valve box $c'$, with the hydraulic main or wash box D, so that gas from either apparatus may be directed into said wash box or main.

In the dome A' of each of the fire places A, are embedded two coiled pipes $a$, $b$, (Figs. 2, 7 and 8,) the inlet end of the pipe $a$ communicating with any conveniently located reservoir of oil, while its discharge end communicates through the top of the super-heating chamber with the first of the fixing or superheating flues contained therein, although it may, if desired, communicate with the flue or neck C, connecting the fire place with the superheater. The inlet end of the coil $b$, communicates with any adjacent steam generator, and its outlet end likewise communicates with the first of the flues of the super-heater, as indicated by the letter $b'$ of Fig. 1 of the drawings. As the oil passes through the coil of pipes in the dome A', it is subjected to the intense heat rising from the fire place beneath and is thereby vaporized and injected in the form of vapor into the first mixing chamber of the superheater, and the steam in its passage through the coil in the dome A' is gradually superheated, and in this form injected into said mixing chamber, where it meets and mingles with the oil vapor from a pipe $a$ and with the products of combustion passing over from the fire place, a diffusing block $d$ being located in the mixing chamber Fig. 9 so as to insure the breaking up and intimate mingling of the volumes of oil vapor, superheated steam and products of combustion entering said chamber. The constant circulation of oil and steam through the casing of the fire place dome, moreover, tends to keep down the temperature of the same and prevents its rapid destruction or the destruction of its lining by reason of the intense heat from the fire place.

The superheater has a series of mixing chambers F, F', F² and F³ in the form of flues lined with tiles of fire clay or other refractory material of suitable form and dimensions as shown in Fig. 2, the ends of each section of tile being flanged, and these flanges being packed by means of interposed rings or gaskets of asbestus or other heat resisting packing material, so as to form a perfectly gas-tight series of flues and prevent any escape of gas therefrom into the fire brick lining of the superheating chamber, this arrangement being much preferable to any plan of forming the flues in the fire brick lining itself, as the joints in the said lining are always more or less defective, so that when the flues are formed directly in the lining, gas in many cases gains access to the metallic casing of the chamber and turns out the same, or accumulates adjacent thereto in sufficient volume to create an explosion when ignited. The flues F', F², F³ extend through the outside of the casing and are provided with suitable caps or covers $f$, which can be readily removed so as to permit access to the flues for cleaning the same, but in order to prevent the heated gases from gaining access to the caps or covers of the flues when the apparatus is in operation, each flue has, some distance from the end of the same, a filling block or tile $g$, of refractory material, which serves as a stop to prevent the access of gas to the cap or valve covering the end of the flue. The final flue $F^3$ of the series has a series of vertical flues $h$, which communicate at the bottom with the lower portion of the central chamber $h'$ of the superheater, this latter chamber being, if desired, packed with broken bricks or other refractory material, in order to cause the gas to take a circuitous course in passing through the same, and thus insure a thorough fixing of the gas before it enters the dome $B'$ and pipe $C$ leading to the wash box. Each of the flues $F$, $F'$, $F^2$ and $F^3$, is preferably inclined downward from its receiving to its discharge end.

Figure 6:
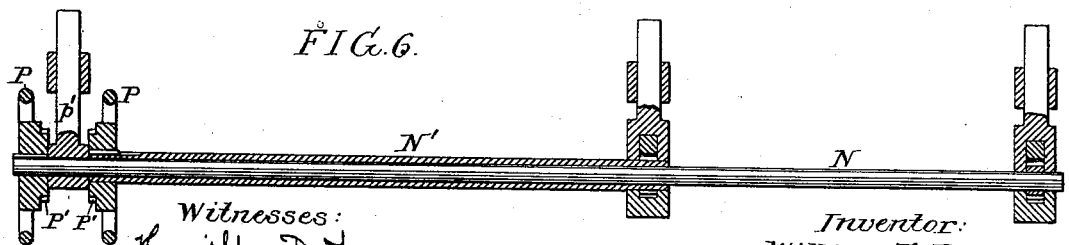

In the operation of gas apparatus of this character, the quality of the gas becomes poor after the operation has been continued for some time, and in the present practice it is usual to permit the poor gas to escape from the superheater dome $B'$ by opening the valve $B^2$ at the top of the same. I find, however, that by conveying the poor gas through a mass of incandescent fuel in the supplementary generator $G$, I am enabled to convert the same into a valuable heating gas and thus not only insure the economical working of the main apparatus, but prevent vitiation of the atmosphere by the discharge of large volumes of gas into the same, which is a source of complaint at present. In order that the gas may be readily directed from either generator to the supplementary generator, each of the pipes $c$ has a vertical branch $c^2$ and valve box $c^4$ with the inlet branch $G'$ of the supplementary generator. The supplementary generator has vertical stacks $H$ and $I$ communicating with each other at the bottom through a transverse arch $J$, a grate $J'$ extending through the arch into each stack and serving to support the mass of fuel in the lower portion of the generator. The upper portion of the stack $I$ is laid with transverse courses of brick so as to form a cellular superheating structure, and the inlet branch $G'$ communicates with the upper end of the stack $H$. If therefore, gas unfit for illuminating purposes is passed into the upper end of the stack $H$ and caused to descend and pass through the mass of incandescent fuel in the lower portion of the supplementary generator, gas available for heating purposes will be produced, this gas escaping from the outlet opening $I'$ at the upper end of the stack $I$ and passing to a special receptacle suitably located. If desired, oil or tar may be injected through a pipe $m$ into the stack $H$, so as to be combined with the gas flowing through said stack, and steam may also be admitted to the stack in addition to or independently of the oil or tar, if desired, a jet pipe $m'$ for this purpose being shown, for instance in the branch $G'$ where it serves to aid in causing the flow of gas into the supplementary generator. Air pipes $n$ supply air to the ash pit of the supplementary generator, if it is desired to blow up the fire therein, the products of combustion from the stack $H$ passing through a valved pipe $H^2$ into the lower portion of the stack $I$ above the fuel therein. The valves $M$ which control the flow of air to the fire place and superheating chamber of each gas generating apparatus, have rods $M'$ operated by rack and pinion mechanism from shafts $N$, $N'$, the shaft $N'$ being tubular and the shaft $N$ passing through the same, as shown in Fig. 6, and both shafts $N$, $N'$ are provided with hand wheels $P$, on the hubs of which are formed ratchet wheels $P'$, and with these ratchet wheels engage pawls $p$ hung to arms on the bracket $p'$ which is located between the two hand wheels and forms a bearing for the outer shaft $N'$, (see Fig. 5.) A ready means is thus provided for operating either of the valves $M$, $M$ and for locking said valves in either an open or closed position.

In the operation of the within described apparatus, fuel is introduced into the fire places $A$ and the fire in one of said fire places is ignited and the blast applied until said fuel has been brought to a condition of incandescence, the products of combustion escaping through the circulating flues and central chamber of the superheater and passing out through the top of the dome $B'$ which has been opened by removing its valve, thus producing water gas. Toward the end of the "run" of each generator, the gas becomes poor, owing to the excess of carbonic acid gas generated. By passing it through the fuel in the supplementary chamber, the carbonic acid gas is converted into carbonic oxide gas, which can be utilized as a fuel gas. When the blasting of the fuel in the first fire place has been continued for the proper length of time, the valve at the top of the dome $B'$ is closed and superheated steam and oil are introduced into the neck $F$, where they combine with the products of combustion and pass with the same through the circulating flues and central chamber of the superheater and thence to the wash box. When gas is thus being generated in one apparatus, the blasting of the fuel in the fire place of the other apparatus is being effected and as soon as the fuel in the fire place of the first apparatus has cooled to such an extent as to interfere with the proper formation of gas, the manufacture of gas in the second apparatus is commenced, and the fuel in the fire place of the first apparatus is again brought to a condition of incandescence to generate a fresh supply of water gas, the two being thus worked, alternately so as to provide for the continuous generation of gas, either of the main generators being put in communication with the supplementary generator whenever the character of the gas which is being delivered from said main generator is such as to warrant its passage into said supplementary generator.

Having thus described my invention, what I claim, and desire to secure by Letters Patent, is—

1. The combination of the fireplace dome of a gas generator, with a steam pipe having a coil embedded in the casing of the dome, said casing made of metal and holding the pipes, substantially as described.

2. The combination of the fireplace dome of a gas generator with steam and oil pipes embedded in the casing of the dome, said casing made of metal and holding the pipes, said pipes leading to and discharging into a mixing chamber from opposite sides and having a diffusing block located between them, substantially as described.

3. The combination in an apparatus for generating gas of the flues extending to an outer casing, the removable caps or covers for said flues and the detachable tiles or plugs, substantially as and for the purposes specified.

4. The combination in a gas generating structure of the main generator, a supplementary generator of a discharge pipe leading from the main generator to the wash box, a branch pipe leading from said discharge pipe to the inlet of the supplementary generator and suitable valves whereby the gas when running poor may be diverted into the supplementary generator and cut off from the wash box, substantially as specified.

In testimony whereof I have signed my name to this specification in the presence of two subscribing witnesses.

WILLIAM T. BATE.

Witnesses:
JNO. E. PARKER,
HARRY SMITH.